United States Patent
Elshafie et al.

(10) Patent No.: US 11,621,822 B2
(45) Date of Patent: Apr. 4, 2023

(54) MITIGATION OF CROWDED UL SPS FEEDBACK TRANSMISSIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/213,838

(22) Filed: Mar. 26, 2021

(65) Prior Publication Data

US 2022/0311581 A1 Sep. 29, 2022

(51) Int. Cl.
*H04L 5/00* (2006.01)
*H04W 72/0446* (2023.01)
*H04L 1/1812* (2023.01)

(52) U.S. Cl.
CPC .......... *H04L 5/0055* (2013.01); *H04L 1/1812* (2013.01); *H04W 72/0446* (2013.01)

(58) Field of Classification Search
CPC . H04L 5/0055; H04L 1/1812; H04W 72/0446

USPC ......................................................... 370/329
See application file for complete search history.

(56) References Cited

U.S. PATENT DOCUMENTS

| | | | |
|---|---|---|---|
| 2021/0352656 A1* | 11/2021 | Choi | H04W 72/0466 |
| 2022/0007399 A1* | 1/2022 | Rastegardoost | H04L 1/1819 |
| 2022/0094483 A1* | 3/2022 | Hosseini | H04L 1/1812 |
| 2022/0095337 A1* | 3/2022 | Wang | H04L 1/1861 |

* cited by examiner

*Primary Examiner* — Mang Hang Yeung
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for mitigation of crowded UL SPS feedback transmissions. A UE may receive, from a base station, a plurality of SPS PDSCHs in a plurality of DL slots, and determine that at least one UL transmission including HARQ-ACK feedback associated with the plurality of SPS PDSCHs overlaps in time with the plurality of DL slots. Hence, the UE may delay the at least one UL transmission including the HARQ-ACK feedback associated with the plurality of SPS PDSCHs to one or more subsequent slots based on a bitmap indicative of the one or more subsequent slots.

25 Claims, 10 Drawing Sheets

MITIGATION OF CROWDED UL SPS FEEDBACK TRANSMISSIONS

BACKGROUND

Technical Field

The present disclosure relates generally to communication systems, and more particularly, to mitigation of crowded uplink (UL) semi-persistent scheduling (SPS) feedback transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from a base station, a plurality of semi-persistent scheduling (SPS) physical downlink shared channels (PDSCHs) in a plurality of downlink (DL) slots; determine that at least one uplink (UL) transmission including hybrid automatic repeat request (HARD)-acknowledgment (ACK) (HARQ-ACK) feedback associated with the plurality of SPS PDSCHs overlaps in time with the plurality of DL slots; and delay the at least one UL transmission including the HARQ-ACK feedback associated with the plurality of SPS PDSCHs to one or more subsequent slots based on a bitmap indicative of the one or more subsequent slots.

In an aspect of the disclosure, a method, a computer-readable medium, and an apparatus are provided. The apparatus may transmit, to a user equipment (UE), a plurality of SPS PDSCHs in a plurality of DL slots, at least one UL transmission including HARQ-ACK feedback associated with the plurality of SPS PDSCHs being overlapped in time with the plurality of DL slots; and receive the at least one UL transmission including the HARQ-ACK feedback associated with the plurality of SPS PDSCHs based on a delay of the at least one UL transmission to one or more subsequent slots associated with a bitmap indicative of the one or more subsequent slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
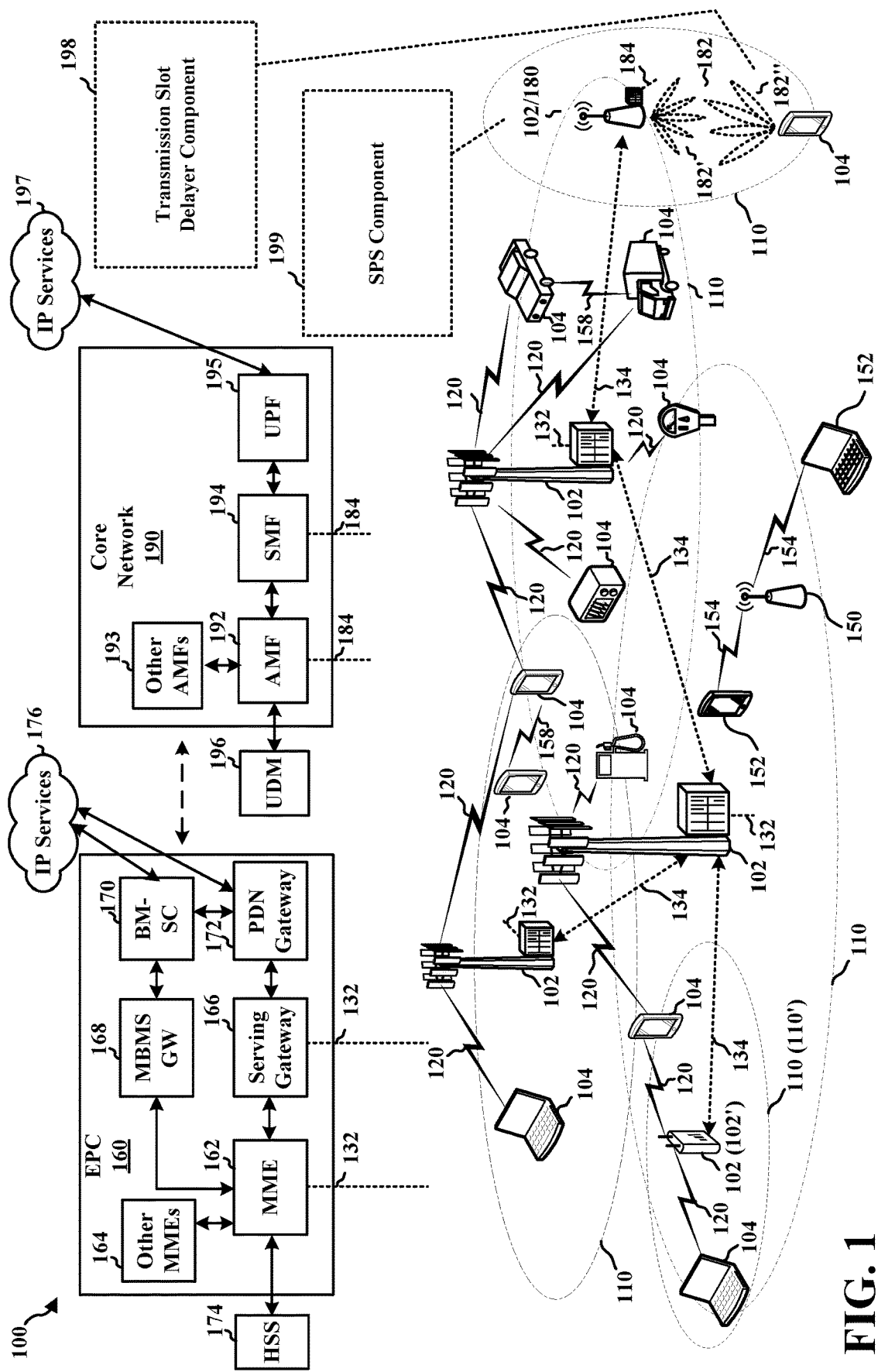
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a transmission slot delayer component 198 configured to receive, from a base station, a plurality of semi-persistent scheduling (SPS) physical downlink shared channels (PDSCHs) in a plurality of DL slots; determine that at least one UL transmission including hybrid automatic repeat request (HARD)-acknowledgment (ACK) (HARQ-ACK) feedback associated with the plurality of SPS PDSCHs overlaps in time with the plurality of DL slots; and delay the at least one UL transmission including the HARQ-ACK feedback associated with the plurality of SPS PDSCHs to one or more subsequent slots based on a bitmap indicative of the one or more subsequent slots. In certain aspects, the base station 180 may include an SPS component 199 configured to transmit, to a UE, a plurality of SPS PDSCHs in a plurality of DL slots, at least one UL transmission including HARQ-ACK feedback associated with the plurality of SPS PDSCHs being overlapped in time with the plurality of DL slots; and receive the at least one UL transmission including the HARQ-ACK feedback associated with the plurality of SPS PDSCHs based on a delay of the at least one UL transmission to one or more subsequent slots associated with a bitmap indicative of the one or more subsequent slots. Although the following description may be focused on 5G NR, the concepts described herein may be applicable to other similar areas, such as LTE, LTE-A, CDMA, GSM, and other wireless technologies.

Figure 2:
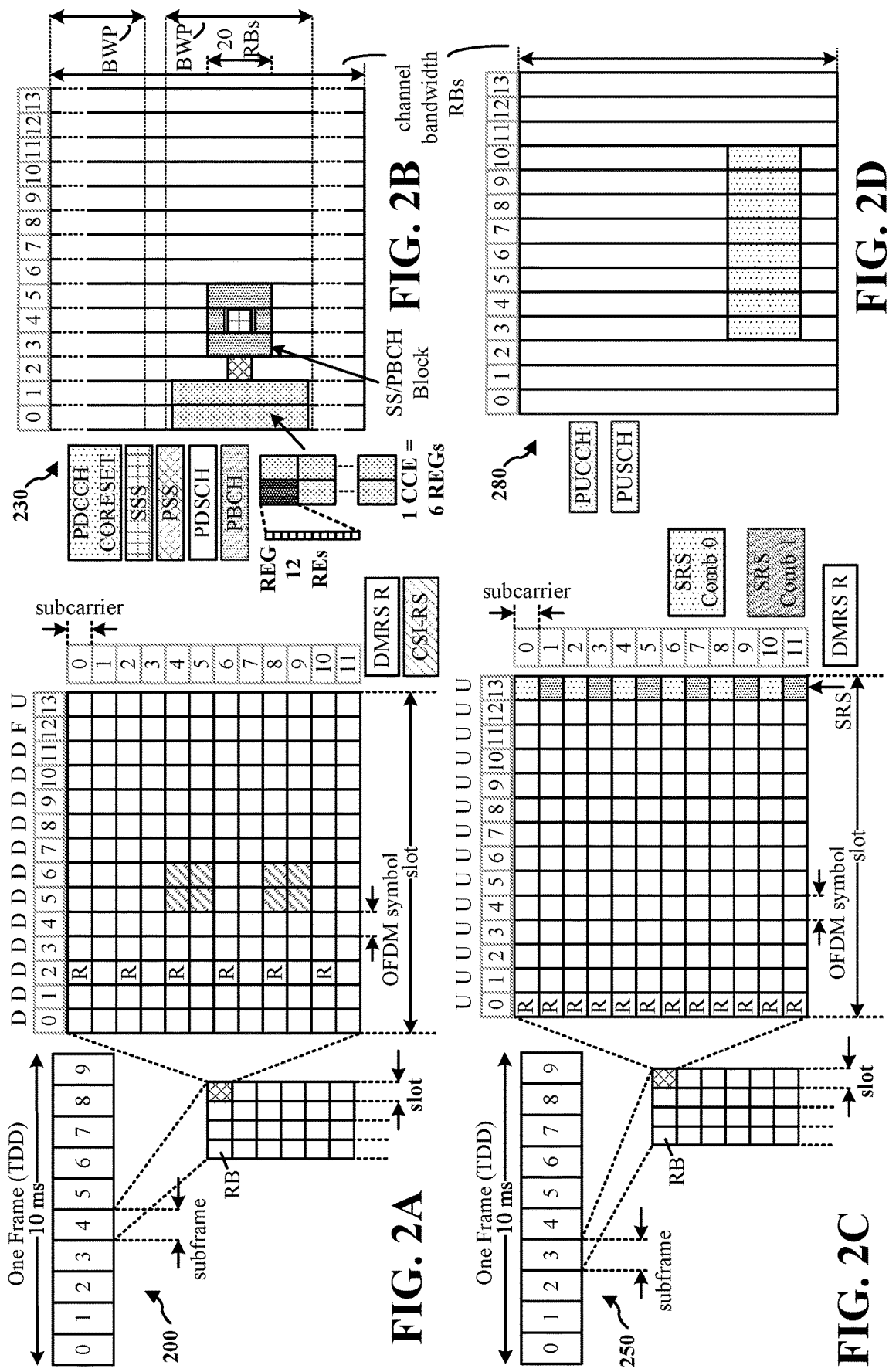
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ-ACK information (ACK/negative ACK (HACK)) feedback. The PUSCH carries data, and may additionally be used to carry a buffer status report (BSR), a power headroom report (PHR), and/or UCI.

Figure 3:
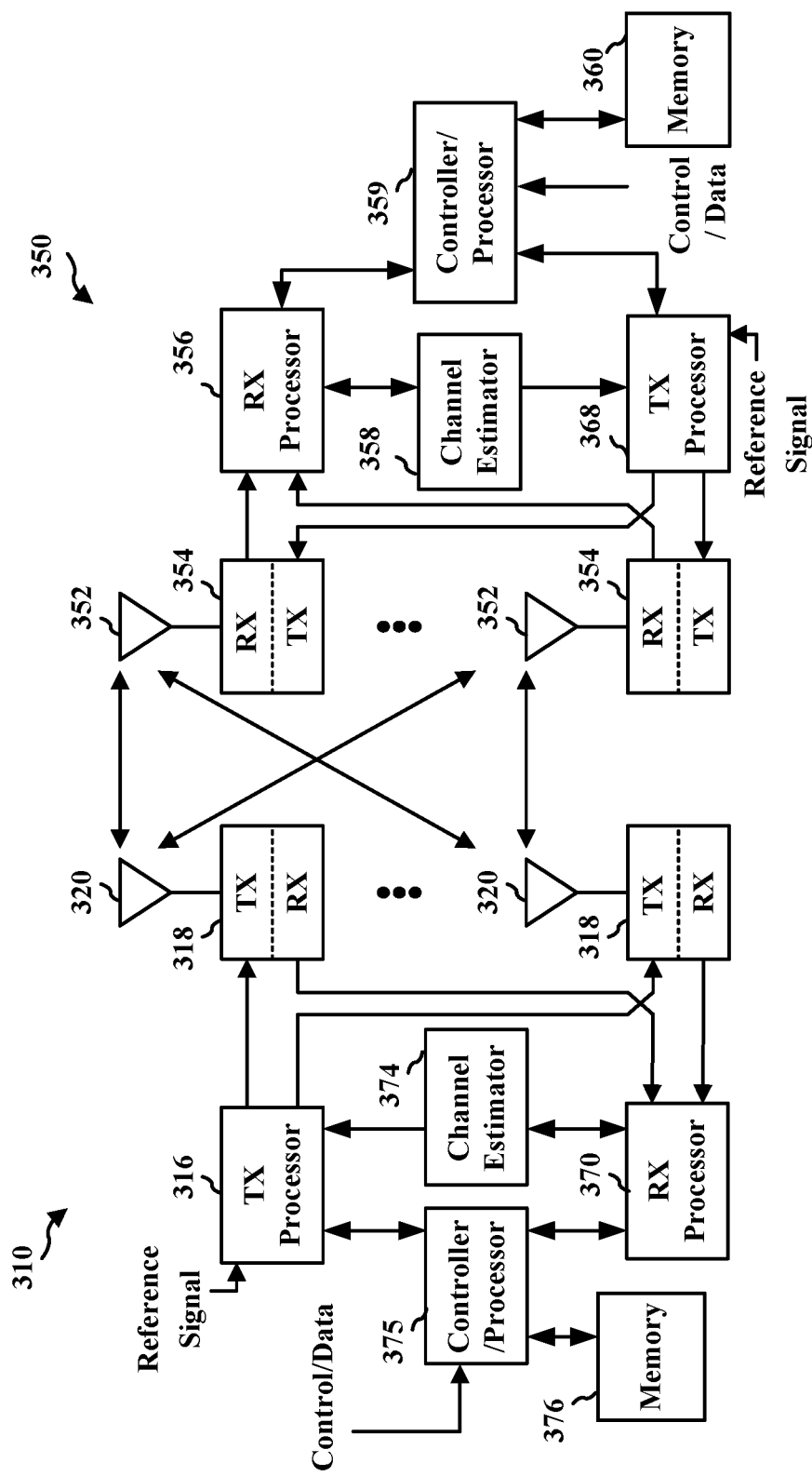
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the transmission slot delayer component 198 of FIG. 1.

At least one of the TX processor 316, the RX processor 370, and the controller/processor 375 may be configured to perform aspects in connection with the SPS component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc., that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
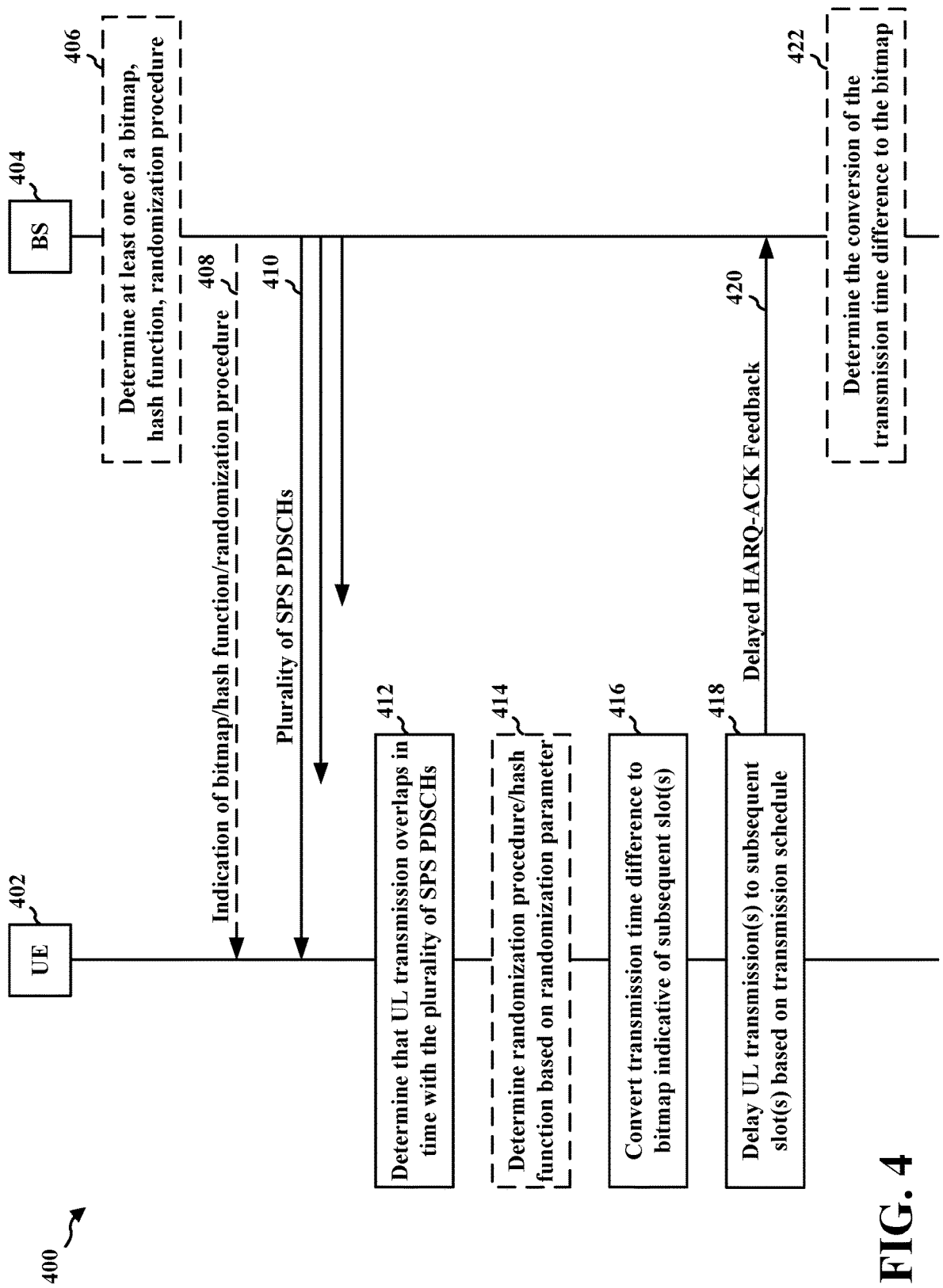
FIG. 4 is a call flow diagram illustrating communications between a UE and a base station.

FIG. 4 is a call flow diagram 400 illustrating communications between a UE 402 and a base station 404. At 406, the base station 404 may determine at least one of a bitmap, a hash function, or a randomization procedure for at least one UL transmission. At 408, the base station 404 may transmit an indication of the bitmap/hash function/randomization procedure to the UE 402, e.g., via RRC, a MAC-control element (MAC-CE), activation DCI, reactivation DCI, group common DCI, etc.

At 410, the base station 404 may transmit a plurality of SPS PDSCHs to the UE 402 in a plurality of DL slots. The UE 402 may determine, at 412, that at least one UL transmission including HARQ-ACK feedback for the plurality of SPS PDSCHs overlaps in time with the plurality of SPS PDSCHs. In aspects, e.g., where the UE 402 does not receive, at 408, the indication of the bitmap/hash function/randomization procedure from the base station 404, the UE may determine, at 414, the randomization procedure/hash function based on one or more randomization parameters.

At 416, the UE 402 may convert a transmission time difference (e.g., corresponding to a K1 value) to a bitmap indicative of subsequent slot(s). The UE 402 may delay, at 418, the UL transmission(s) to the subsequent slot(s) based on the bitmap and/or a transmission schedule for the UL transmission(s). At 420, the UE 402 may transmit the delayed HARQ-ACK feedback to the base station 404 (e.g., based on the transmission schedule). At 422, the base station 404 may determine the conversion of the transmission time difference to the bitmap.

Figure 5:
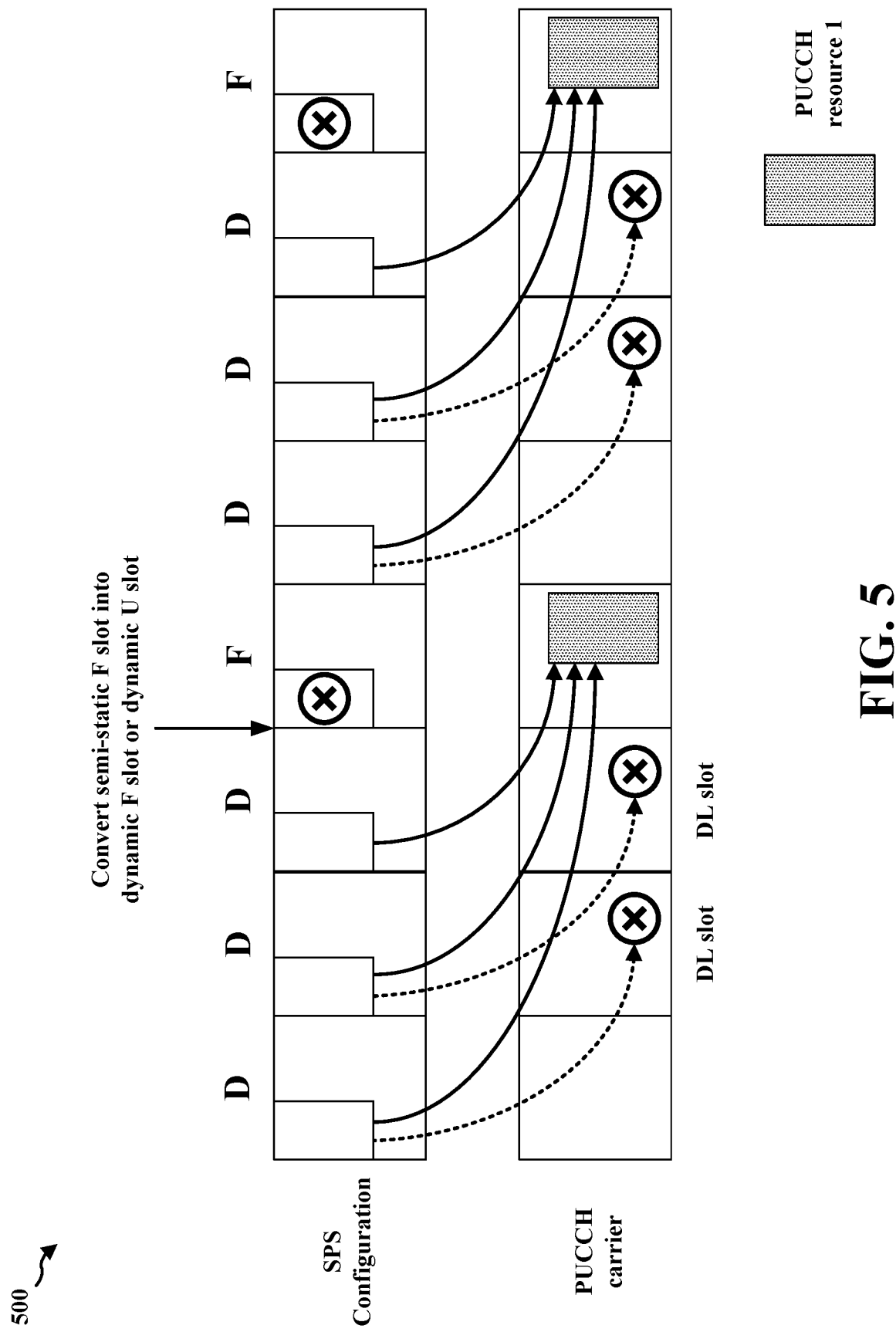
FIG. 5 illustrates a diagram for delayed hybrid automatic repeat request (HARQ)-acknowledgment (ACK) (HARQ-ACK) feedback.
Figure 6:
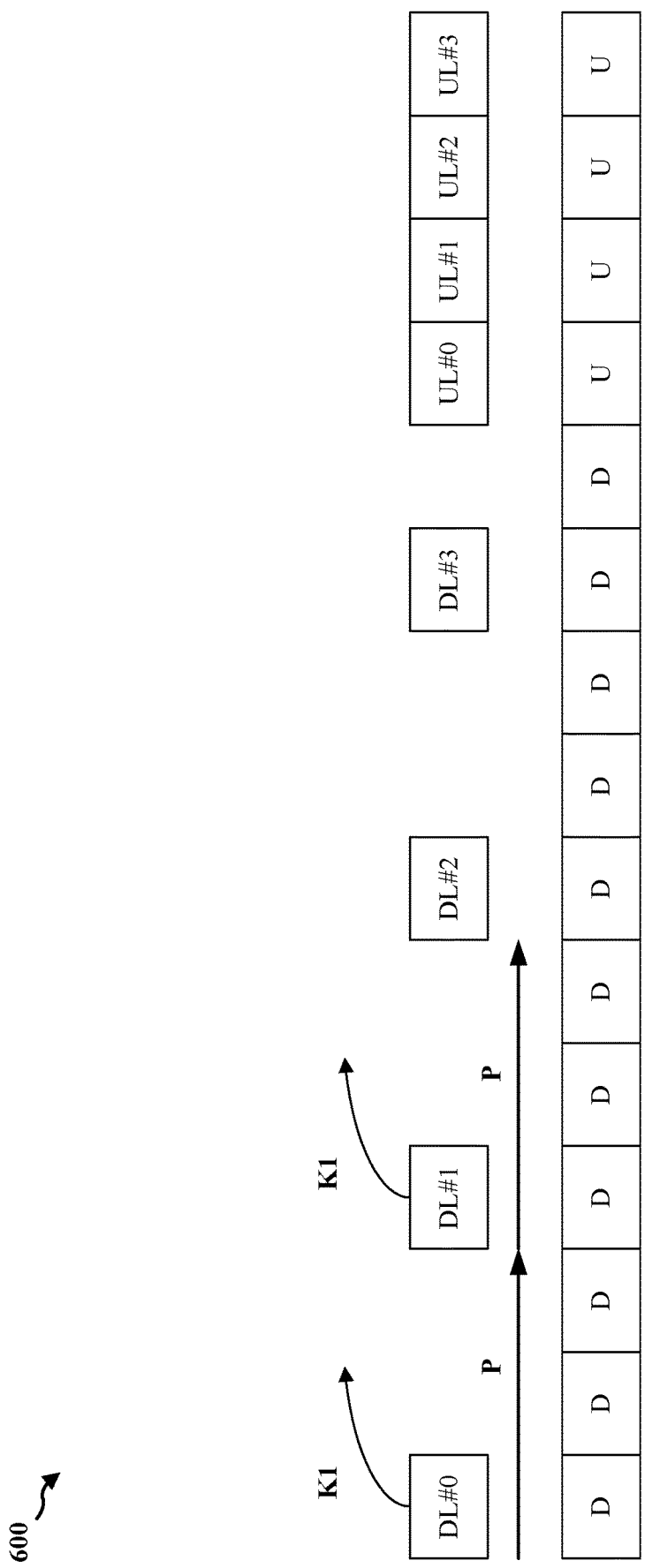
FIG. 6 illustrates a diagram for delayed HARQ-ACK feedback.

FIGS. 5-6 illustrate diagrams 500-600 for delayed HARQ-ACK feedback. DL SPS for periodic traffic may be utilized in NR applications. For TDD systems, if a slot of a slot schedule for reporting HARQ-ACK feedback for the SPS is a DL slot, a UE may not transmit the HARQ-ACK feedback in such slot. Thus, additional resources may be used by the base station via SPS PDSCH retransmissions based on a missed HARQ-ACK feedback/report from the UE.

A reliability of the HARQ-ACK feedback for SPS PDSCH may be improved based on delaying the HARQ-ACK feedback that collides with the DL slot/symbols to a later UL slot/symbols (e.g., delaying the HARQ-ACK feedback from a second slot and a third slot, as illustrated in the diagram 500, to a fourth slot). However, UL slots may include different numbers of bits, which may cause an unequal loading of bits across the later UL slots. In some cases, later/subsequent UL slots may not be associated with a payload limit. Such techniques for delaying the HARQ-ACK feedback may also result in the HARQ-ACK feedback being received out-of-order by the base station. Accordingly, a reduction or distribution of bit loading for one or more of the subsequent UL slots may further improve the reliability of the HARQ-ACK feedback for the SPS PDSCH.

An SPS configuration may include a plurality of SPS PDSCH occasions. As illustrated in the diagram 600, a time period between consecutive SPS PDSCH occasions may correspond to a periodicity (p) of the SPS configuration. The periodicity may be RRC configured. For example, the base station may configure the UE based on SPS configuration 0 through SPS configuration N, where the base station may configure each SPS configuration based on a previous periodicity. The UE may receive SPS activation DCI in association with the SPS configurations. After a time period K0 from reception of the SPS activation DCI, the UE may receive a first PDSCH and, based on the periodicity, determine an expected time of a DL grant. A time period between the DL grant/reception of the PDSCH and transmitting the HARQ-ACK feedback may correspond to K1. After a time period K1 from the reception of the PDSCH, the UE may transmit the HARQ-ACK feedback.

In the diagram 500, the TDD configuration corresponds to DDDFDDDF, where D is indicative of a DL slot and F is indicative of a flexible slot. A semi-static flexible slot may be converted into a dynamic flexible slot or a dynamic UL slot. A UE may be configured to transmit, via a PUCCH carrier, an UL PUCCH that includes the HARQ-ACK (e.g., ACK/NACK) feedback determined from decoding the data received from the base station. HARQ-ACK feedback that collides with a DL slot/symbols may be delayed to a next slot/sub-slot that includes enough available UL symbols to transmit the HARQ-ACK feedback. Other UEs may also defer HARQ-ACK feedback to the same UL slot/sub-slot as the UE based on similar HARQ-ACK feedback deferral techniques. Thus, the HARQ-ACK feedback of a plurality of UEs may accumulate among the plurality of UEs, which may all attempt to transmit the accumulated HARQ-ACK at a same time in a same UL slot (e.g., via PUCCH resource 1). Therefore, the UL slot may become crowded with UL SPS feedback transmissions.

A single UE may also accumulate an increased number of bits for transmission on deferred UL SPS resources, which may reduce a reliability of the UL transmission from the UE. For example, instead of transmitting 10 bits, which may have been configured for the UL slot, the UE may attempt to transmit 20 bits. Thus, a reliability associated with decoding the UL transmission at the base station may be decreased. When a plurality of UEs attempt to use the same UL slot, the reliability may be further decreased. A plurality of UEs in the TTD system that delay respective HARQ-ACK feedback transmissions to a first available UL slot after a group of one or more DL slots may generate congestion in the first available UL slot. The congestion may decrease the reliability of the HARQ-ACK feedback based on interference caused by the plurality of UEs at the base station. By distributing the HARQ-ACK feedback/reporting more evenly across the plurality of subsequent UL slots, congestion at the first available UL slot may be reduced and the reliability of the HARQ-ACK feedback/reporting may be improved.

The UE may implement pseudo-random procedures (e.g., based on a slot offset, predetermined rules, etc.) for determining a PUCCH resource to be used for transmitting the deferred SPS HARQ-ACK feedback. The pseudo-random procedures may be UE-specific and may be determined implicitly by the UE based on at least one parameter (e.g., associated with K1) or based on explicit signaling from the base station. The UE may utilize the plurality of subsequent UL slots for a transmission of accumulated payload bits to the base station. For example, the UE may distribute data transmissions over a determined pseudo-random bitmap based on K1.

K1 may be converted into a bitmap based on one or more randomization parameters. The conversion of K1 into the bitmap may be performed on a per SPS basis based on a size of the UL resources associated with a current TDD configuration. For example, K1 may be converted into a bitmap associated with 3 slots, which may correspond to 3 of the plurality of subsequent UL slots. The bitmap may then be used to transmit data on UL over the 3 slots. For instance, if K1=3 slots, K1 may be converted into binary in association with the 3 UL slots to provide a binary value of 011. The binary value 011 may indicate that the UE will utilize slot 1 and slot 2 for transmission of the accumulated HARQ-ACK from the SPS configurations, but not slot 0.

In further aspects, a complement of the K1 binary value may be utilized to determine the UL transmission slots, where the compliment of the binary value may cause the accumulated HARQ-ACK feedback to be transmitted sooner than the binary value (e.g., when K1 is small). For instance, if K1=1, HARQ-ACK feedback may be transmitted more quickly than when K1=3. Converting K1 to a binary may provide a binary value of 001. Hence, the UE may transmit the HARQ-ACK feedback at the third slot/sub-slot, while the complementary binary value of 110 corresponds to the UE transmitting the HARQ-ACK feedback at slot 0 and slot 1, rather than at the third slot (e.g., slot 2). An additional technique may be to read the binary value 001 from right to left to provide a reverse binary value of 100, such that the UE may transmit the HARQ-ACK feedback at the first slot (e.g., slot 0), instead of at the third slot (e.g., slot 2).

An increased amount of collisions/interference may occur when the plurality of UEs utilize a same K1. Each of the plurality of UEs may generate a randomizer based on one or more PDSCH parameters. The parameters may include time domain resource allocation (TDRA) table parameters (e.g., a starting OFDM symbol, a number of OFDM symbols, K0, etc.), a modulation and coding scheme (MCS), a starting RB index, an ending RB index, periodicity, a SPS configuration index, a configured scheduling (CS)-radio network temporary identifier (RNTI) (CS-RNTI), amongst others. The one or more PDSCH parameters may be utilized for determining a pseudo-random function or hash function. For example, the CS-RNTI may be associated with scrambling and/or randomization of the K1 binary value. That is, CS-RNTI bits may be used to convert K1 to the binary value, and based on an XOR operation, the UE may use the bits in association with a hash function or bit mapping.

A randomization/hash function, e.g., R(K1, PARAM), may be generated to scramble the K1 binary value by R(PARAM), for a specific SPS configuration or common bitmap among SPS configurations of a same priority as the UE. An input to R( ) may correspond to a combination of parameters associated with the SPS configurations. In aspects, the parameters, hash function, etc., may be indicated by the base station. For example, the base station may define two hash functions that may receive two parameters (e.g., K1 and PARAM) as input for the UE to determine a corresponding bitmap.

The base station may determine sets of randomization parameters for randomizing K1 and/or the bitmaps. Randomization procedures for K1 and/or the bitmaps may be UE-specific or may be used for a group of UEs. The sets of randomization parameters (e.g., randomization functions, randomized bits, etc.) used to randomize K1 may be signaled to the UE via RRC or a MAC-CE. When a resource collision is determined, K1 and the sets of randomization parameters indicated by the base station may be used to determine the UL slots for transmitting the feedback. K1 and other parameters may be used as a pointer to the sets of randomization parameters or to the bitmaps, rather than introducing a different DCI field, bitmaps, or indices. An index of the sets of randomization parameters or the bitmaps may be signaled in activation DCI and/or reactivation DCI. The base station may signal, in the activation/reactivation DCI, DCI, or a group of common DCI, a bitmap to be used by each UE of the plurality of UEs for all SPS configurations or a group of SPS configurations associated with the UEs.

The UE may be configured to allocate data for transmission more evenly among available UL slots (e.g., UL #0 through UL #3 in the diagram 600), rather than transmitting accumulated data in a first available UL slot (e.g., UL #0). For instance, 4 UL slots may be associated with a bitmap b=[1 0 0 1] (e.g., per SPS configuration or for a plurality of SPS configurations of a same priority as the UE). The UE may allocate accumulated HARQ-ACK packets based on the bitmap. For the bitmap b=[1001], 4 UL slots may be determined based on the TDD configuration, where slot 0/UL #0 and slot 3/UL #3 may be used for transmitting data and slot 1/UL #1 and 2/UL #2 may not be used for transmitting the data. Thus, the UE may transmit a first half of a payload size at a first available UL slot (e.g., UL #0) and transmit a second half of the payload size at the fourth available UL slot (e.g., UL #3).

In aspects, where Q is indicative of a total number of HARQ-ACK feedback packets to be transmitted to the bases station, the UE may determine to transmit Q1 feedback packet at the first available UL slot (e.g., UL #0) and transmit a remaining number of feedback packets Q−Q1 at another available UL slot (e.g., UL #3). That is, Q may correspond to the total number of HARQ-ACK feedback packets accumulated based on the DL TDD configuration. In further aspects, Q1=Floor(Q/sum(b)) feedback packets may be transmitted at the first non-zero location in the bitmap, where sum(b) is the number of non-zero elements in the bitmap (e.g., sum(b)=2 in the bitmap b=[1001])—while Q2 feedback packets, which may equal Q−Q1, may be transmitted at the second non-zero location in the bitmap. For unequal payload sizes, such as 9 bits that correspond to decoding 9 different PDSCHs, an ACK/NACK may be transmitted in association with each bit. Since 9 bits divided by two UL transmission slots equals 4.5 bits/slot, and a slot may not be used to transmit half of a feedback packet, 4 packets may be transmitted at the first available UL slot (e.g., UL #0) and the remaining 5 packets may be transmitted at the second available UL slot (e.g., UL #3).

Another allocation of the UL packets may be based on the first available UL slot (e.g., UL #0) being used to transmit Q1 packets, the second available UL slot (e.g., UL #1) being used to transmit Q1 packets, the third available UL slot (e.g., UL #2) being used to transmit Q1 packets, and the fourth available UL slot (e.g., UL #3) being used to transmit Q−(Q1*(F−1)), where F corresponds to flexible symbols. In an example where Q=10 and F=4, a floor may be equal to 10/4 (e.g., floor(2.5), which may be reduced to 2). Thus, the first available UL slot may include 2 packets, the second available UL slot may include 2 packets, the third available UL slot may include 2 packets, and the fourth available UL slot may include 3 packets (e.g., 10−(2*3)=4). In an alternative example where Q=10 and F=4, a ceiling may be equal to 10/4 (e.g., ceil(2.5), which may be increased to 3). Thus, the first available UL slot may include 3 packets, the second available UL slot may include 3 packets, the third available UL slot may include 3 packets, and the fourth available UL slot may include 1 packets (e.g., 10−(3*3)=1).

In a further example, UE1 may include bitmap b1=[1001], UE2 may include bitmap b2=[0101], and UE3 may include bitmap b3=[1010]. Thus, the plurality of UL slots may be associated with differing numbers of UEs and/or bits per UE. Transmitting feedback packets based on bitmaps may reduce ambiguities between the UEs and the base station, maintain a more even distribution between the slots for the UE and/or the plurality of UEs, reduce out-of-order HARQ-ACK feedback, etc. Based on the data being transmitted in the UL slots of the TDD configuring in an order of reception of the PDSCHs, the UE may allocate transmission of the accumulated packets across the plurality of subsequent UL slots.

Figure 7:
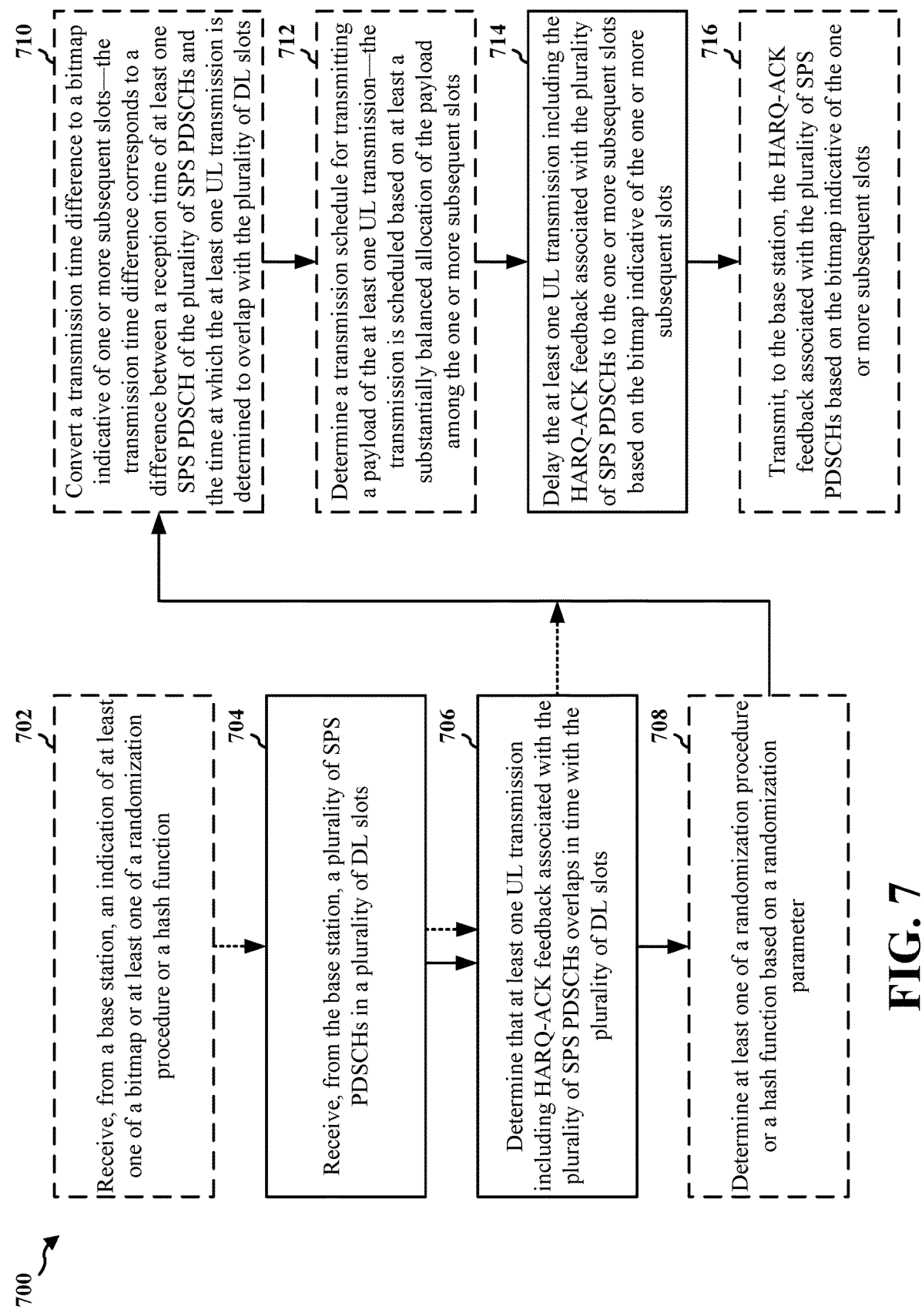
FIG. 7 is a flowchart of a method of wireless communication at a UE.

FIG. 7 is a flowchart 700 of a method of wireless communication. The method may be performed by a UE (e.g., the UE 104/402, the apparatus 902, etc.), which may include the memory 360 and which may be the entire UE 104/402 or a component of the UE 104/402, such as the TX processor 368, the RX processor 356, and/or the controller/processor 359.

At 702, the UE may receive, from a base station, an indication of at least one of a bitmap or at least one of a randomization procedure or a hash function. For example, referring to FIG. 4, the UE 402 may receive, at 408, an indication of a bitmap/hash function/randomization function/etc. from the base station 404. The indication may be received, at 408, from the base station 404 via at least one of RRC signaling, a MAC-CE, DCI, reactivation DCI, or group common DCI. The reception may be performed, e.g., by the reception component 930 of the apparatus 902 in FIG. 9.

At 704, the UE may receive, from the base station, a plurality of SPS PDSCHs in a plurality of DL slots. For example, referring to FIG. 4, the UE 402 may receive, at 410, the plurality of SPS PDSCHs from the base station 404. The reception may be performed, e.g., by the reception component 930 of the apparatus 902 in FIG. 9.

At 706, the UE may determine that at least one UL transmission including HARQ-ACK feedback associated with the plurality of SPS PDSCHs overlaps in time with the plurality of DL slots. For example, referring to FIGS. 4-5, the UE 402 may determine, at 412, that an UL transmission overlaps in time with the plurality of SPS PDSCHs received, at 410, from the base station 404. In the diagram 500, the PUCCH resource 1 would overlap with a DL slot, in some cases, if the HARQ-ACK feedback were to be transmitted in a next slot after each SPS PDSCH is received. The determination may be performed, e.g., by the determination component 940 of the apparatus 902 in FIG. 9.

At 708 (e.g., where the UE does not receive, at 702, the indication of the at least one of the bitmap or the at least one of the randomization procedure or the hash function), the UE may determine at least one of a randomization procedure or a hash function based on a randomization parameter. For example, referring to FIG. 4, the UE 402 may determine, at 414, a randomization procedure/hash function based on a randomization parameter. The determination may be performed, e.g., by the determination component 940 of the apparatus 902 in FIG. 9.

At 710, the UE may convert a transmission time difference to a bitmap indicative of one or more subsequent slots—the transmission time difference corresponds to a difference between a reception time of at least one SPS PDSCH of the plurality of SPS PDSCHs and the time at which the at least one UL transmission is determined to overlap with the plurality of DL slots. For example, referring to FIGS. 4 and 6, the UE 402 may convert, at 416, a transmission time difference to a bitmap indicative of subsequent slot(s). In the diagram 600, the transmission time difference may correspond to K1. The transmission time difference (e.g., K1) may be converted to the bitmap based on at least one of the randomization procedure or the hash function. The bitmap based on the at least one of the randomization procedure or the hash function may be different from a second bitmap of a second UE. The conversion, at 710, may be based on the determination, at 706, individually, or based on both the determination, at 706, and the determination, at 708. The conversion may be performed, e.g., by the conversion component 942 of the apparatus 902 in FIG. 9.

At 712, the UE may determine a transmission schedule for transmitting a payload of the at least one UL transmission— the transmission is scheduled based on at least a substantially balanced allocation of the payload among the one or more subsequent slots. For example, referring to FIGS. 4 and 6, the UE 402 may delay, at 414, UL transmission(s) to subsequent slot(s) based on a transmission schedule. The allocation may be at least substantially balanced based on dividing the payload evenly among the one or more subsequent slots (e.g., UL #0 through UL #3 in the diagram 600) and, if the division corresponds to fractional allocations of the payload, rounding all of the fractional allocations of the payload up or down to a nearest non-fractional allocation of the payload for all except one slot (e.g., UL #3) of the one or more subsequent slots (e.g., UL #0 through UL #3), where the one slot (e.g., UL #3) of the one or more subsequent slots (e.g., UL #0 through UL #3) may be allocated a remainder of the payload. The one slot (e.g., UL #3) of the one or more subsequent slots (e.g., UL #0 through UL #3) that is allocated the remainder of the payload may correspond to a last slot (e.g., UL #3) of the one or more subsequent slots (e.g., UL #0 through UL #3). The determination may be performed, e.g., by the determination component 940 of the apparatus 902 in FIG. 9.

At 714, the UE may delay the at least one UL transmission including the HARQ-ACK feedback associated with the plurality of SPS PDSCHs to the one or more subsequent slots based on the bitmap indicative of the one or more subsequent slots. For example, referring to FIG. 4, the UE 402 may delay, at 418, UL transmission(s) to subsequent slot(s) based on the conversion, at 416, of the transmission time difference (e.g., K1) to the bitmap and based on the transmission schedule. In the diagram 500, PUCCH resource 1 may be delayed from a DL slot to a flexible slot. In examples, the bitmap may correspond to at least one of a binary value, a compliment of the binary value, or a reverse of the binary value, where a first digit type (e.g., 1) of the binary value is indicative of an UL slot and a second digit type (e.g., 0) of the binary value is indicative of a DL slot. A length of the bitmap may be based on a TDD configuration. The delaying may be performed, e.g., by the delayer component 944 of the apparatus 902 in FIG. 9.

At 716, the UE may transmit, to the base station, the HARQ-ACK feedback associated with the plurality of SPS PDSCHs based on the bitmap indicative of the one or more subsequent slots. For example, referring to FIG. 4, the UE 402 may transmit, at 420, delayed HARQ-ACK feedback to the base station 404. The transmission may be performed, e.g., by the transmission component 934 of the apparatus 902 in FIG. 9.

Figure 8:
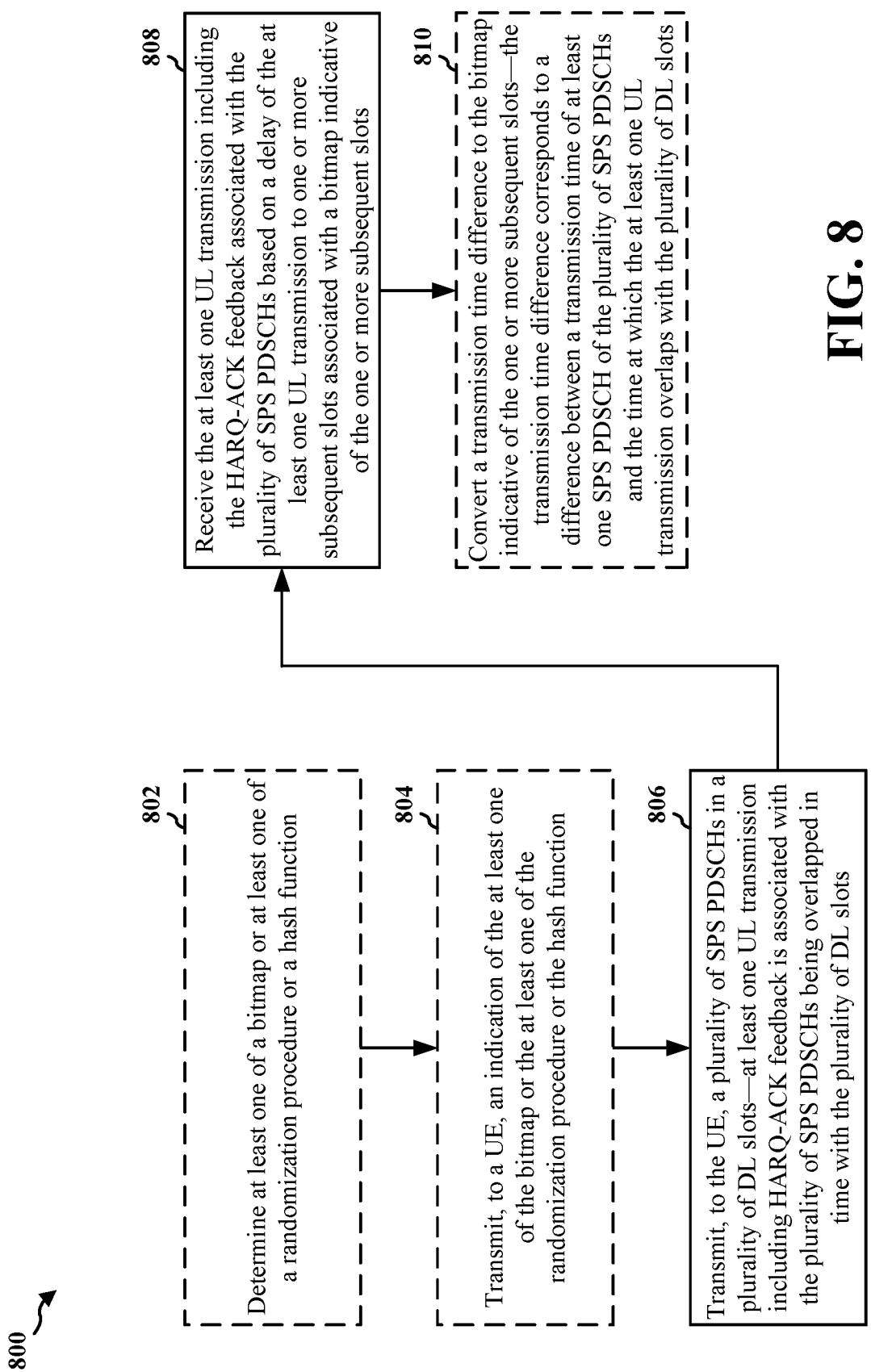
FIG. 8 is a flowchart of a method of wireless communication at a base station.

FIG. 8 is a flowchart 800 of a method of wireless communication. The method may be performed by a base station (e.g., the base station 102/404, the apparatus 1002, etc.), which may include the memory 376 and which may be the entire base station 102/404 or a component of the base station 102/404, such as the TX processor 316, the RX processor 370, and/or the controller/processor 375.

At 802, the base station may determine at least one of a bitmap or at least one of a randomization procedure or a hash function. For example, referring to FIG. 4, the base station 404 may determine, at 406, at least one of a bitmap, hash function, a randomization procedure, etc. The determination may be performed, e.g., by the determination component 1040 of the apparatus 1002 in FIG. 10.

At 804, the base station may transmit, to a UE, an indication of the at least one of the bitmap or the at least one of the randomization procedure or the hash function. For example, referring to FIG. 4, the base station 404 may transmit, at 408, an indication of the bitmap/hash function/ randomization procedure. The indication may be transmitted, at 408, to the UE 402 via at least one of RRC signaling, a MAC-CE, activation DCI, reactivation DCI, or group common DCI. The transmission may be performed, e.g., by the transmission component 1034 of the apparatus 1002 in FIG. 10.

At 806, the base station may transmit, to the UE, a plurality of SPS PDSCHs in a plurality of DL slots—at least one UL transmission including HARQ-ACK feedback is associated with the plurality of SPS PDSCHs being overlapped in time with the plurality of DL slots. For example, referring to FIGS. 4-5, the base station 404 may transmit, at 410, a plurality of SPS PDSCHs to the UE 402 that, as illustrated in the diagram 500, may overlap with a DL slot, if the HARQ-ACK feedback were to be received in a next slot after each SPS PDSCH is transmitted. A transmission schedule for receiving a payload of the at least one UL transmission may be based on at least a substantially balanced allocation of the payload among the one or more subsequent slots. For example, the allocation may be at least substantially balanced based on dividing the payload evenly among the one or more subsequent slots (e.g., UL #0 through UL #3 in the diagram 600) and, if the division corresponds to fractional allocations of the payload, rounding all of the fractional allocations of the payload up or down to a nearest non-fractional allocation of the payload for all except one slot (e.g., UL #3) of the one or more subsequent slots (e.g., UL #0 through UL #3), where the one slot (e.g., UL #3) of the one or more subsequent slots (e.g., UL #0 through UL #3) may be allocated a remainder of the payload. The one slot (e.g., UL #3) of the one or more subsequent slots (e.g., UL #0 through UL #3) that is allocated the remainder of the payload may correspond to a last slot (e.g., UL #3) of the one or more subsequent slots (e.g., UL #0 through UL #3). The transmission may be performed, e.g., by the transmission component 1034 of the apparatus 1002 in FIG. 10.

At 808, the base station may receive the at least one UL transmission including the HARQ-ACK feedback associated with the plurality of SPS PDSCHs based on a delay of the at least one UL transmission to one or more subsequent slots associated with a bitmap indicative of the one or more subsequent slots. For example, referring to FIG. 4, the base station 404 may receive, at 420, the delayed HARQ-ACK feedback from the UE 402. The bitmap may correspond to at least one of a binary value, a compliment of the binary value, or a reverse of the binary value, where a first digit type (e.g., 1) of the binary value may be indicative of an UL slot and a second digit type (e.g., 0) of the binary value may be indicative of a DL slot. A length of the bitmap may be based on a TDD configuration. The reception may be performed, e.g., by the reception component 1030 of the apparatus 1002 in FIG. 10.

At 810, the base station may convert a transmission time difference to the bitmap indicative of the one or more subsequent slots—the transmission time difference corresponds to a difference between a transmission time of at least one SPS PDSCH of the plurality of SPS PDSCHs and the time at which the at least one UL transmission overlaps with the plurality of DL slots. For example, referring to FIGS. 4 and 6, the base station 404 may determine, at 422, the conversion of the transmission time difference to the bitmap. The conversion of the transmission time difference to the bitmap may be indicative of subsequent slot(s). In the diagram 600, the transmission time difference may correspond to K1. The transmission time difference (e.g., K1) may be converted to the bitmap based on at least one of the randomization procedure or the hash function. The bitmap based on the at least one of the randomization procedure or the hash function may be different from a second bitmap of a second UE. The conversion may be performed, e.g., by the conversion component 1042 of the apparatus 1002 in FIG. 10.

Figure 9:
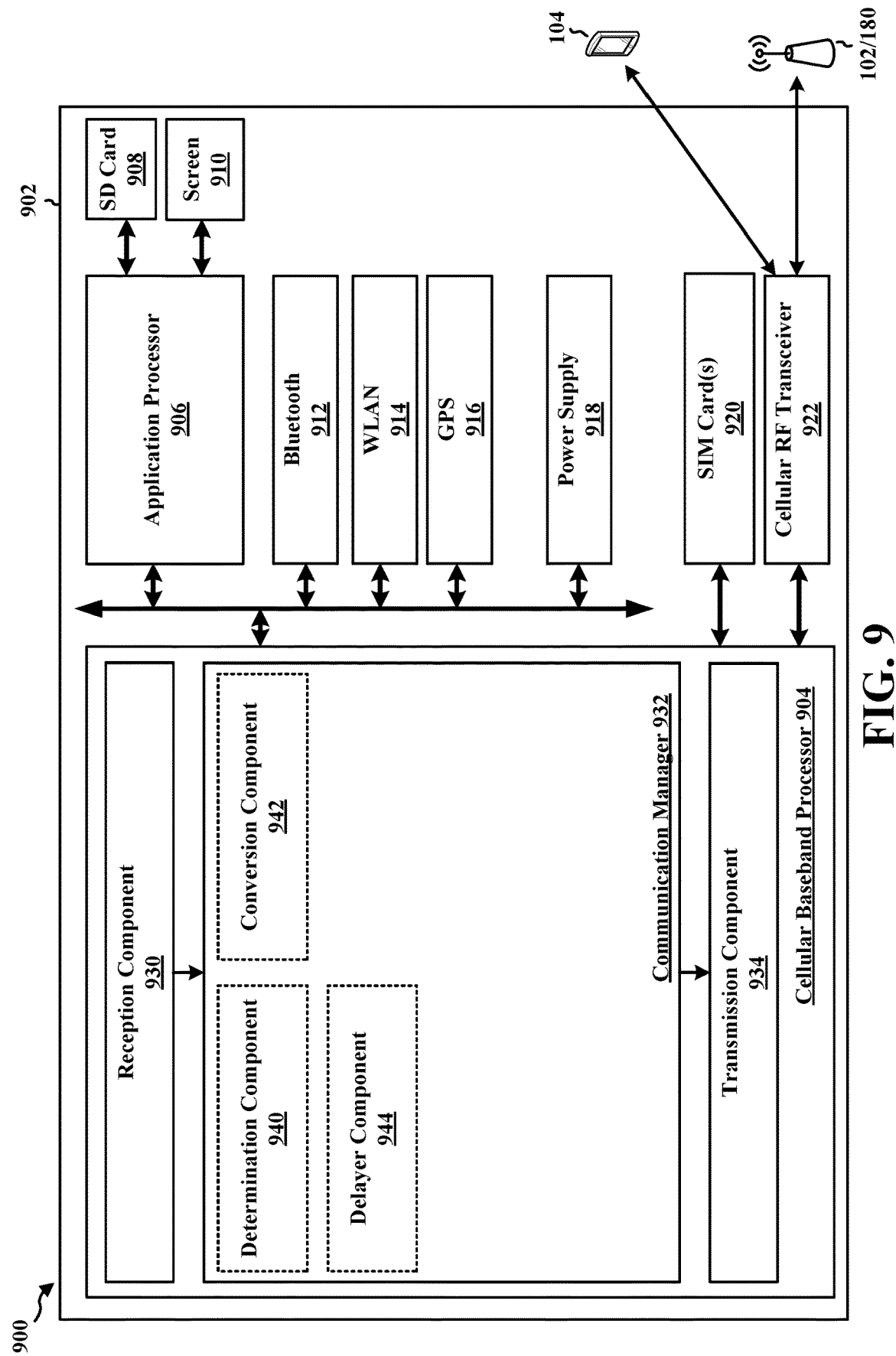
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The reception component 930 is configured, e.g., as described in connection with 702 and 704, to receive, from a base station, an indication of at least one of a bitmap or at least one of a randomization procedure or a hash function; and to receive, from the base station, a plurality of SPS PDSCHs in a plurality of DL slots. The transmission component 934 is configured, e.g., as described in connection with 716, to transmit, to the base station, the HARQ-ACK feedback associated with the plurality of SPS PDSCHs based on the bitmap indicative of the one or more subsequent slots.

The communication manager 932 includes a determination component 940 that is configured, e.g., as described in connection with 706, 708, and 710, to determine that at least one UL transmission including HARQ-ACK feedback associated with the plurality of SPS PDSCHs overlaps in time with the plurality of DL slots; to determine at least one of a randomization procedure or a hash function based on a randomization parameter; and to determine a transmission schedule for transmitting a payload of the at least one UL transmission—the transmission is scheduled based on at least a substantially balanced allocation of the payload among the one or more subsequent slots. The communication manager 932 further includes a conversion component 942 that is configured, e.g., as described in connection with 710, to convert a transmission time difference to a bitmap indicative of one or more subsequent slots—the transmission time difference corresponds to a difference between a reception time of at least one SPS PDSCH of the plurality of SPS PDSCHs and the time at which the at least one UL transmission is determined to overlap with the plurality of DL slots. The communication manager 932 further includes a delayer component 944 that is configured, e.g., as described in connection with 714, to delay the at least one UL transmission including the HARQ-ACK feedback associated with the plurality of SPS PDSCHs to the one or more subsequent slots based on the bitmap indicative of the one or more subsequent slots.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, a plurality of SPS PDSCHs in a plurality of DL slots; means for determining that at least one UL transmission including HARQ-ACK feedback associated with the plurality of SPS PDSCHs overlaps in time with the plurality of DL slots; and means for delaying the at least one UL transmission including the HARQ-ACK feedback associated with the plurality of SPS PDSCHs to one or more subsequent slots based on a bitmap indicative of the one or more subsequent slots. The apparatus 902 further includes means for converting a transmission time difference to the bitmap indicative of the one or more subsequent slots, the transmission time difference corresponding to a difference between a reception time of at least one SPS PDSCH of the plurality of SPS PDSCHs and the time at which the at least one UL transmission is determined to overlap with the plurality of DL slots. The apparatus 902 further includes means for determining the at least one of the randomization procedure or the hash function based on a randomization parameter. The apparatus 902 further includes means for receiving, from the base station, an indication of at least one of the bitmap or the at least one of the randomization procedure or the hash function. The apparatus 902 further includes means for determining a transmission schedule for transmitting a payload of the at least one UL transmission, where the transmission is scheduled based on at least a substantially balanced allocation of the payload among the one or more subsequent slots. The apparatus 902 further includes means for transmitting, to the base station, the HARQ-ACK feedback associated with the plurality of SPS PDSCHs based on the bitmap indicative of the one or more subsequent slots.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
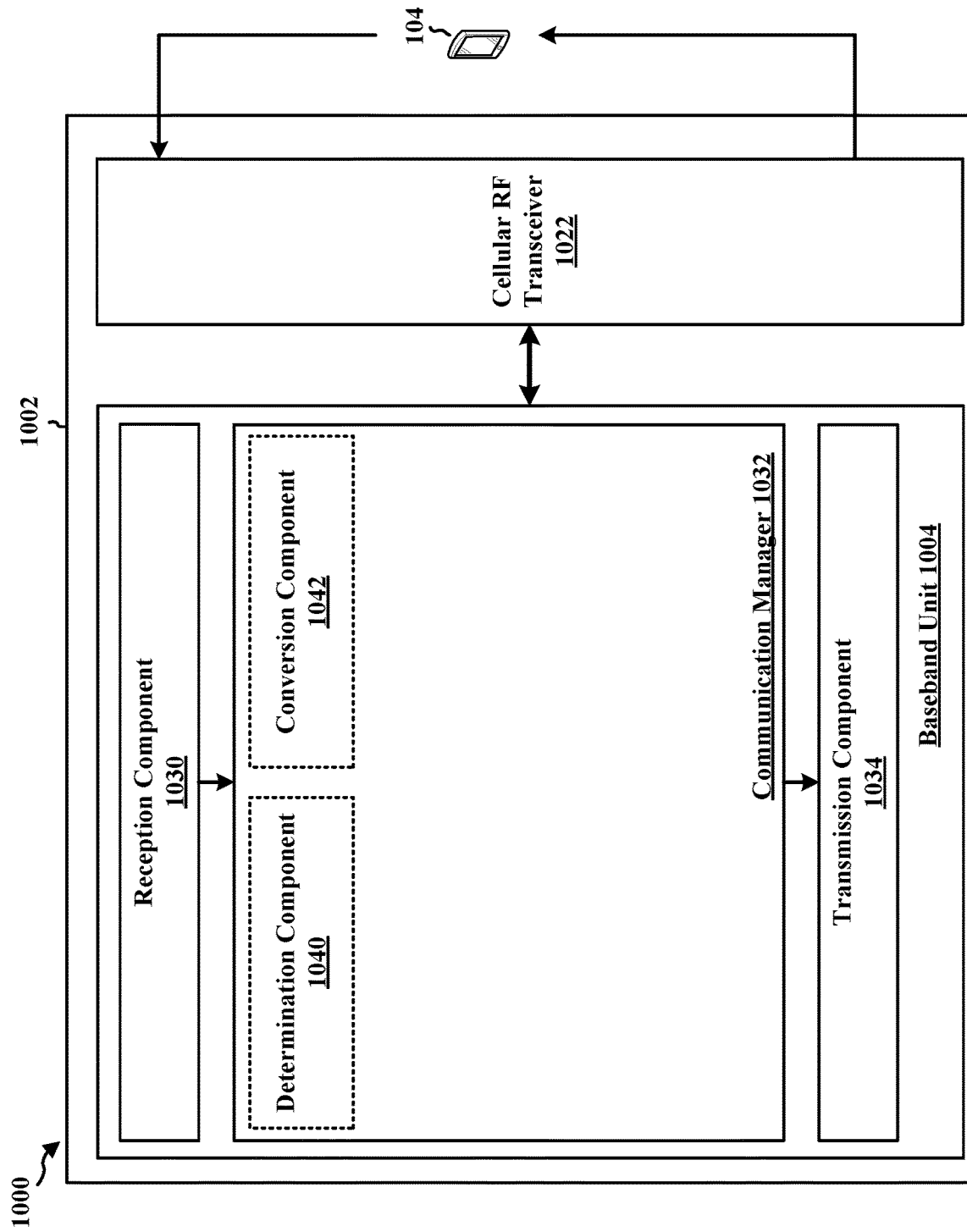
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The reception component 1030 is configured, e.g., as described in connection with 808, to receive the at least one UL transmission including the HARQ-ACK feedback associated with the plurality of SPS PDSCHs based on a delay of the at least one UL transmission to one or more subsequent slots associated with a bitmap indicative of the one or more subsequent slots. The communication manager 1032 includes a determination component 1040 that is configured, e.g., as described in connection with 802, to determine at least one of a bitmap or at least one of a randomization procedure or a hash function. The communication manager 1032 further includes a conversion component 1042 that is configured, e.g., as described in connection with 810, to convert a transmission time difference to the bitmap indicative of the one or more subsequent slots—the transmission time difference corresponds to a difference between a transmission time of at least one SPS PDSCH of the plurality of SPS PDSCHs and the time at which the at least one UL transmission overlaps with the plurality of DL slots. The transmission component 1034 is configured, e.g., as described in connection with 804 and 806, to transmit, to a UE, an indication of the at least one of the bitmap or the at least one of the randomization procedure or the hash function; and to transmit, to the UE, a plurality of SPS PDSCHs in a plurality of DL slots—at least one UL transmission including HARQ-ACK feedback is associated with the plurality of SPS PDSCHs being overlapped in time with the plurality of DL slots.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to a UE, a plurality of SPS PDSCHs in a plurality of DL slots, at least one UL transmission including HARQ-ACK feedback associated with the plurality of SPS PDSCHs being overlapped in time with the plurality of DL slots; and means for receiving the at least one UL transmission including the HARQ-ACK feedback associated with the plurality of SPS PDSCHs based on a delay of the at least one UL transmission to one or more subsequent slots associated with a bitmap indicative of the one or more subsequent slots. The apparatus 1002 further includes means for converting a transmission time difference to the bitmap indicative of the one or more subsequent slots, the transmission time difference corresponding to a difference between a transmission time of at least one SPS PDSCH of the plurality of SPS PDSCHs and the time at which the at least one UL transmission overlaps with the plurality of DL slots. The apparatus 1002 further includes means for determining at least one of the bitmap or the at least one of the randomization procedure or the hash function; and means for transmitting, to the UE, an indication of the at least one of the bitmap or the at least one of the randomization procedure or the hash function.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from a base station, a plurality of SPS PDSCHs in a plurality of DL slots; determining that at least one UL transmission including HARQ-ACK feedback associated with the plurality of SPS PDSCHs overlaps in time with the plurality of DL slots; and delaying the at least one UL transmission including the HARQ-ACK feedback associated with the plurality of SPS PDSCHs to one or more subsequent slots based on a bitmap indicative of the one or more subsequent slots.

Aspect 2 may be combined with aspect 1 and further includes converting a transmission time difference to the bitmap indicative of the one or more subsequent slots, the transmission time difference corresponding to a difference between a reception time of at least one SPS PDSCH of the plurality of SPS PDSCHs and the time at which the at least one UL transmission is determined to overlap with the plurality of DL slots.

Aspect 3 may be combined with any of aspects 1-2 and includes that the transmission time difference is converted to the bitmap based on at least one of a randomization procedure or a hash function.

Aspect 4 may be combined with any of aspects 1-3 and further includes determining the at least one of the randomization procedure or the hash function based on a randomization parameter.

Aspect 5 may be combined with any of aspects 1-3 and further includes receiving, from the base station, an indication of at least one of the bitmap or the at least one of the randomization procedure or the hash function.

Aspect 6 may be combined with any of aspects 1-5 and includes that the indication is received from the base station via at least one of RRC signaling, a MAC-CE, activation DCI, reactivation DCI, or group common DCI.

Aspect 7 may be combined with any of aspects 1-6 and includes that the bitmap based on the at least one of the randomization procedure or the hash function is different from a second bitmap of a second UE.

Aspect 8 may be combined with any of aspects 1-7 and includes that the bitmap corresponds to at least one of a binary value, a compliment of the binary value, or a reverse of the binary value, where a first digit type of the binary value is indicative of an UL slot and a second digit type of the binary value is indicative of a DL slot.

Aspect 9 may be combined with any of aspects 1-8 and includes that a length of the bitmap is based on a TDD configuration.

Aspect 10 may be combined with any of aspects 1-9 and further includes determining a transmission schedule for transmitting a payload of the at least one UL transmission, where the transmission is scheduled based on at least a substantially balanced allocation of the payload among the one or more subsequent slots.

Aspect 11 may be combined with any of aspects 1-10 and includes that the allocation is at least substantially balanced based on dividing the payload evenly among the one or more subsequent slots and, if the division corresponds to fractional allocations of the payload, rounding all of the fractional allocations of the payload up or down to a nearest non-fractional allocation of the payload for all except one slot of the one or more subsequent slots, where the one slot of the one or more subsequent slots is allocated a remainder of the payload of the all except the one slot of the one or more subsequent slots.

Aspect 12 may be combined with any of aspects 1-11 and includes that the one slot of the one or more subsequent slots that is allocated the remainder of the payload corresponds to a last slot of the one or more subsequent slots.

Aspect 13 may be combined with any of aspects 1-12 and further includes transmitting, to the base station, the HARQ-ACK feedback associated with the plurality of SPS PDSCHs based on the bitmap indicative of the one or more subsequent slots.

Aspect 14 is a method of wireless communication at a base station, comprising: transmitting, to a UE, a plurality of SPS PDSCHs in a plurality of DL slots, at least one UL transmission including HARQ-ACK feedback associated with the plurality of SPS PDSCHs being overlapped in time with the plurality of DL slots; and receiving the at least one UL transmission including the HARQ-ACK feedback associated with the plurality of SPS PDSCHs based on a delay of the at least one UL transmission to one or more subsequent slots associated with a bitmap indicative of the one or more subsequent slots.

Aspect 15 may be combined with aspect 14 and further includes comprising converting a transmission time difference to the bitmap indicative of the one or more subsequent slots, the transmission time difference corresponding to a difference between a transmission time of at least one SPS PDSCH of the plurality of SPS PDSCHs and the time at which the at least one UL transmission overlaps with the plurality of DL slots.

Aspect 16 may be combined with any of aspects 14-15 and includes that the transmission time difference is converted to the bitmap based on at least one of a randomization procedure or a hash function.

Aspect 17 may be combined with any of aspects 14-16 and further includes determining at least one of the bitmap or the at least one of the randomization procedure or the hash function; and transmitting, to the UE, an indication of the at least one of the bitmap or the at least one of the randomization procedure or the hash function.

Aspect 18 may be combined with any of aspects 14-17 and includes that the indication is transmitted to the UE via at least one of RRC signaling, a MAC-CE, activation DCI, reactivation DCI, or group common DCI.

Aspect 19 may be combined with any of aspects 14-18 and includes that the bitmap based on the at least one of the randomization procedure or the hash function is different from a second bitmap of a second UE.

Aspect 20 may be combined with any of aspects 14-19 and includes that the bitmap corresponds to at least one of a binary value, a compliment of the binary value, or a reverse of the binary value, where a first digit type of the binary value is indicative of an UL slot and a second digit type of the binary value is indicative of a DL slot.

Aspect 21 may be combined with any of aspects 14-20 and includes that a length of the bitmap is based on a TDD configuration.

Aspect 22 may be combined with any of aspects 14-21 and includes that a transmission schedule for receiving a payload of the at least one UL transmission is based on at least a substantially balanced allocation of the payload among the one or more subsequent slots.

Aspect 23 may be combined with any of aspects 14-22 and includes that the allocation is at least substantially balanced based on dividing the payload evenly among the one or more subsequent slots and, if the division corresponds to fractional allocations of the payload, rounding all of the fractional allocations of the payload up or down to a nearest non-fractional allocation of the payload for all except one slot of the one or more subsequent slots, where the one slot of the one or more subsequent slots is allocated a remainder of the payload of the all except the one slot of the one or more subsequent slots.

Aspect 24 may be combined with any of aspects 14-23 and includes that the one slot of the one or more subsequent slots that is allocated the remainder of the payload corresponds to a last slot of the one or more subsequent slots.

Aspect 25 is an apparatus for wireless communication including at least one processor coupled to a memory and configured to implement a method as in any of aspects 1-24.

Aspect 26 is an apparatus for wireless communication including means for implementing a method as in any of aspects 1-24.

Aspect 27 is a computer-readable medium storing computer executable code, the code when executed by at least one processor causes the at least one processor to implement a method as in any of aspects 1-24.

What is claimed is:

1. An apparatus for wireless communication at a user equipment (UE), comprising:
a memory; and
at least one processor coupled to the memory and configured to:
receive, from a base station, a plurality of semi-persistent scheduling (SPS) physical downlink shared channels (PDSCHs) in a plurality of downlink (DL) slots;
determine that at least one uplink (UL) transmission including hybrid automatic repeat request (HARD)-acknowledgment (ACK) (HARQ-ACK) feedback associated with the plurality of SPS PDSCHs overlaps in time with the plurality of DL slots;
determine a transmission schedule for transmitting a payload of the at least one UL transmission, wherein the transmission schedule is based on at least a substantially balanced allocation of the payload among one or more subsequent slots occurring after the plurality of DL slots, wherein the substantially balanced allocation of the payload is based on dividing the payload evenly among the one or more subsequent slots, wherein the division includes rounding fractional allocations of the payload up or down to a nearest non-fractional allocation of the payload for all except one slot of the one or more subsequent slots based on the division producing the fractional allocations of the payload, and wherein the one slot of the one or more subsequent slots is allocated a remainder of the payload of the all except the one slot of the one or more subsequent slots; and
delay the at least one UL transmission including the HARQ-ACK feedback associated with the plurality of SPS PDSCHs to the one or more subsequent slots based on a bitmap indicative of the one or more subsequent slots and the transmission schedule.

2. The apparatus of claim 1, wherein the at least one processor is further configured to convert a transmission time difference to the bitmap indicative of the one or more subsequent slots, the transmission time difference corresponding to a difference between a reception time of at least one SPS PDSCH of the plurality of SPS PDSCHs and the time at which the at least one UL transmission is determined to overlap with the plurality of DL slots.

3. The apparatus of claim 2, wherein the transmission time difference is converted to the bitmap based on at least one of a randomization procedure or a hash function.

4. The apparatus of claim 3, wherein the at least one processor is further configured to determine the at least one of the randomization procedure or the hash function based on a randomization parameter.

5. The apparatus of claim 3, wherein the at least one processor is further configured to receive, from the base station, an indication of at least one of the bitmap or the at least one of the randomization procedure or the hash function.

6. The apparatus of claim 5, wherein the indication is received from the base station via at least one of radio resource control (RRC) signaling, a medium access control-control element (MAC-CE), activation downlink control information (DCI), reactivation DCI, or group common DCI.

7. The apparatus of claim 3, wherein the bitmap based on the at least one of the randomization procedure or the hash function is different from a second bitmap of a second UE.

8. The apparatus of claim 1, wherein the bitmap corresponds to at least one of a binary value, a compliment of the binary value, or a reverse of the binary value, wherein a first digit type of the binary value is indicative of an UL slot and a second digit type of the binary value is indicative of a DL slot.

9. The apparatus of claim 1, wherein a length of the bitmap is based on a time division duplex (TDD) configuration.

10. The apparatus of claim 1, wherein the one slot of the one or more subsequent slots that is allocated the remainder of the payload corresponds to a last slot of the one or more subsequent slots.

11. The apparatus of claim 1, wherein the at least one processor is further configured to transmit, to the base station, the HARQ-ACK feedback associated with the plurality of SPS PDSCHs based on the bitmap indicative of the one or more subsequent slots.

12. An apparatus for wireless communication at a base station, comprising:
 a memory; and
 at least one processor coupled to the memory and configured to:
  transmit, to a user equipment (UE), a plurality of semi-persistent scheduling (SPS) physical downlink shared channels (PDSCHs) in a plurality of downlink (DL) slots, at least one uplink (UL) transmission including hybrid automatic repeat request (HARQ)-acknowledgment (ACK) (HARQ-ACK) feedback associated with the plurality of SPS PDSCHs being overlapped in time with the plurality of DL slots; and
  receive the at least one UL transmission including the HARQ-ACK feedback associated with the plurality of SPS PDSCHs based on a delay of the at least one UL transmission to one or more subsequent slots associated with a bitmap indicative of the one or more subsequent slots, wherein a transmission schedule for receiving a payload of the at least one UL transmission is based on at least a substantially balanced allocation of the payload among the one or more subsequent slots, wherein the substantially balanced allocation of the payload is based on dividing the payload evenly among the one or more subsequent slots, wherein the division includes rounding fractional allocations of the payload up or down to a nearest non-fractional allocation of the payload for all except one slot of the one or more subsequent slots based on the division producing the fractional allocations of the payload, and wherein the one slot of the one or more subsequent slots is allocated a remainder of the payload of the all except the one slot of the one or more subsequent slots.

13. The apparatus of claim 12, wherein the at least one processor is further configured to convert a transmission time difference to the bitmap indicative of the one or more subsequent slots, the transmission time difference corresponding to a difference between a transmission time of at least one SPS PDSCH of the plurality of SPS PDSCHs and the time at which the at least one UL transmission overlaps with the plurality of DL slots.

14. The apparatus of claim 13, wherein the transmission time difference is converted to the bitmap based on at least one of a randomization procedure or a hash function.

15. The apparatus of claim 14, wherein the at least one processor is further configured to:
 determine at least one of the bitmap or the at least one of the randomization procedure or the hash function; and
 transmit, to the UE, an indication of the at least one of the bitmap or the at least one of the randomization procedure or the hash function.

16. The apparatus of claim 15, wherein the indication is transmitted to the UE via at least one of radio resource control (RRC) signaling, a medium access control-control element (MAC-CE), activation downlink control information (DCI), reactivation DCI, or group common DCI.

17. The apparatus of claim 14, wherein the bitmap based on the at least one of the randomization procedure or the hash function is different from a second bitmap of a second UE.

18. The apparatus of claim 12, wherein the bitmap corresponds to at least one of a binary value, a compliment of the binary value, or a reverse of the binary value, wherein a first digit type of the binary value is indicative of an UL slot and a second digit type of the binary value is indicative of a DL slot.

19. The apparatus of claim 12, wherein a length of the bitmap is based on a time division duplex (TDD) configuration.

20. The apparatus of claim 12, wherein the one slot of the one or more subsequent slots that is allocated the remainder of the payload corresponds to a last slot of the one or more subsequent slots.

21. A method of wireless communication at a user equipment (UE), comprising:
 receiving, from a base station, a plurality of semi-persistent scheduling (SPS) physical downlink shared channels (PDSCHs) in a plurality of downlink (DL) slots;
 determining that at least one uplink (UL) transmission including hybrid automatic repeat request (HARD)-acknowledgment (ACK) (HARQ-ACK) feedback associated with the plurality of SPS PDSCHs overlaps in time with the plurality of DL slots;
 determining a transmission schedule for transmitting a payload of the at least one UL transmission, wherein the transmission schedule is based on at least a substantially balanced allocation of the payload among one or more subsequent slots occurring after the plurality of DL slots, wherein the substantially balanced allocation of the payload is based on dividing the payload evenly among the one or more subsequent slots, wherein the division includes rounding fractional allocations of the payload up or down to a nearest non-fractional allocation of the payload for all except one slot of the one or more subsequent slots based on the division producing the fractional allocations of the payload, and wherein the one slot of the one or more subsequent slots is allocated a remainder of the payload of the all except the one slot of the one or more subsequent slots; and
 delaying the at least one UL transmission including the HARQ-ACK feedback associated with the plurality of SPS PDSCHs to the one or more subsequent slots based on a bitmap indicative of the one or more subsequent slots and the transmission schedule.

22. The method of claim 21, further comprising converting a transmission time difference to the bitmap indicative of the one or more subsequent slots, the transmission time difference corresponding to a difference between a reception time of at least one SPS PDSCH of the plurality of SPS PDSCHs and the time at which the at least one UL transmission is determined to overlap with the plurality of DL slots.

23. A method of wireless communication at a base station, comprising:

transmitting, to a user equipment (UE), a plurality of semi-persistent scheduling (SPS) physical downlink shared channels (PDSCHs) in a plurality of downlink (DL) slots, at least one uplink (UL) transmission including hybrid automatic repeat request (HARD)-acknowledgment (ACK) (HARQ-ACK) feedback associated with the plurality of SPS PDSCHs being overlapped in time with the plurality of DL slots; and receiving the at least one UL transmission including the HARQ-ACK feedback associated with the plurality of SPS PDSCHs based on a delay of the at least one UL transmission to one or more subsequent slots associated with a bitmap indicative of the one or more subsequent slots wherein a transmission schedule for receiving a payload of the at least one UL transmission is based on at least a substantially balanced allocation of the payload among the one or more subsequent slots, wherein the substantially balanced allocation of the payload is based on dividing the payload evenly among the one or more subsequent slots, wherein the division includes rounding fractional allocations of the payload up or down to a nearest non-fractional allocation of the payload for all except one slot of the one or more subsequent slots based on the division producing the fractional allocations of the payload, and wherein the one slot of the one or more subsequent slots is allocated a remainder of the payload of the all except the one slot of the one or more subsequent slots.

24. The method of claim 23, further comprising converting a transmission time difference to the bitmap indicative of the one or more subsequent slots, the transmission time difference corresponding to a difference between a transmission time of at least one SPS PDSCH of the plurality of SPS PDSCHs and the time at which the at least one UL transmission overlaps with the plurality of DL slots.

25. The method of claim 23, further comprising:
determining at least one of the bitmap or at least one of a randomization procedure or a hash function; and
transmitting, to the UE, an indication of the at least one of the bitmap or the at least one of the randomization procedure or the hash function.

* * * * *